United States Patent [19]

Yamauchi et al.

[11] Patent Number: 4,958,998
[45] Date of Patent: Sep. 25, 1990

[54] GLASSLIKE CARBON COMPOSITE MATERIAL AND METHOD OF PREPARING THE SAME

[75] Inventors: Michihide Yamauchi, Osaka; Hiroyuki Nagamori, Tochigi; Masanobu Wakasa; Atsushi Ishikawa, both of Wakayama, all of Japan

[73] Assignee: Kao Corporation, Tokyo, Japan

[21] Appl. No.: 119,002

[22] Filed: Nov. 10, 1987

[30] Foreign Application Priority Data

Nov. 10, 1986 [JP] Japan .................. 61-268444
Sep. 9, 1987 [JP] Japan .................. 62-227115

[51] Int. Cl.$^5$ .................................. C01B 31/00
[52] U.S. Cl. ...................... 423/445; 423/449; 252/504; 252/507; 252/508
[58] Field of Search .............. 423/445, 447.5, 449; 252/504, 507, 508

[56] References Cited

U.S. PATENT DOCUMENTS

| | | | |
|---|---|---|---|
| Re. 32,319 | 12/1986 | Korb et al. ............. | 423/445 |
| 3,574,548 | 4/1971 | Sands et al. ............. | 423/449 |
| 3,719,452 | 3/1973 | Accountius ............. | 423/449 |
| 3,749,700 | 7/1973 | Stephens et al. ............. | 423/449 |
| 3,922,383 | 11/1975 | Wilks et al. ............. | 423/449 |
| 3,927,186 | 12/1975 | Vinton et al. ............. | 423/445 |
| 4,426,368 | 1/1984 | Quella et al. ............. | 423/445 |
| 4,582,632 | 4/1986 | Rokujo et al. ............. | 423/448 |
| 4,668,496 | 5/1987 | Korb et al. ............. | 423/445 |
| 4,722,817 | 2/1988 | Nakano et al. ............. | 423/447.5 |
| 4,774,140 | 9/1988 | Wakasa et al. ............. | 423/449 |

OTHER PUBLICATIONS

Cowlard, A New Form of Carbon, Component Technology, vol. 4, No. 6, Feb. 1971, pp. 3-7.

*Primary Examiner*—Olik Chaudhuri
*Assistant Examiner*—Robert M. Kunemund
*Attorney, Agent, or Firm*—Cushman, Darby & Cushman

[57] ABSTRACT

The present invention provides a glasslike carbon composite material which has reduced surface friction and excellent wear resistance and durability, because of the addition of specific ultrafine ceramic particles as a reinforcing material to a main component of glasslike carbon. The present invention further provides a method for preparing such a glasslike carbon composite material, as well as a method for preparing a glasslike carbon material.

5 Claims, 1 Drawing Sheet

F I G. 1

F I G. 2

GLASSLIKE CARBON COMPOSITE MATERIAL AND METHOD OF PREPARING THE SAME

BACKGROUND AND SUMMARY OF THE INVENTION

The present invention relates to glasslike carbon composite materials. More particularly, it relates to a composite material containing glasslike carbon as its main component and having high wear resistance and small coefficient of friction which is highly suitable as a material for precision processed elements.

Various recording/reproduction devices are currently available in the market which use sheets and films having a magnetic layer, or paper as the recording medium. These recording/reproduction devices include a number of elements which either constantly or temporarily come into sliding contact with the recording medium, such as a head slider of a flexible disk, floating slide of a hard disk, a thermal printing head, and a magnetic head. These elements are required to have excellent durability and properties which will not damage the recording medium coming in sliding contact therewith. Moreover, these elements, and the magnetic head in particular, are subjected to super precision processings with accuracies on the order of several microns to several tens of microns. The materials in turn are required to have appropriately superior characteristics for such precision processing.

Silicon dioxides, alumina (aluminum dioxides), silicon carbides, hard glasses, alumina ceramics, ferrites, calcium titanates and barium titanates are commonly used as the material for such elements. Although these materials are suited for precision parts, their hardness and inferior slidability are likely to damage a recording medium. Graphites are known as a material having high slidability characteristics. However, they are highly susceptible to wear and are not stable in maintaining a precise shape over a long period of time. Because of their constituent particles, graphites have insufficient denseness and thus are not suited for use in precision parts.

Various studies were conducted to overcome these defects and found that glasslike carbon is effective in solving the defects. Patent applications have been filed for the findings and laid open as Jap. Pat. Appln. Laid-open Nos. Sho 59-84325 and Sho 59-144019.

Glasslike carbon has an appropriate degree of wearability which, when slid against another material typically used in recording media, becomes worn before the other material is damaged.

Applications have been filed for a method of preparing glasslike carbon having excellent wear resistance. These applications are laid open under the Nos. Sho 60-171209, Sho 60-131816, Sho 60-171208, Sho 60-171209, Sho 60-171210 and Sho 60-171211.

Upon further experiments, it was found that glasslike carbon may sometimes fail to give sufficient wear resistance when used alone, depending on the surface hardness or coarseness of the materials with which it is contacted.

The present invention aims to provide a composite material for sliding elements that can be used without coating the material with a lubricant or protective film and which:

(1) has small friction resistance against the recording medium material to be contacted with,
(2) would not damage the material to be contacted with, and
(3) is excellent in its wear resistance and durability.

DETAILED DESCRIPTION OF THE INVENTION

According to the first aspect of the present invention, the glasslike carbon composite material is characterized in that it comprises as its main component glasslike carbon, and as its reinforcing component one or more types of ultrafine particles having an average particle size of less than 1 $\mu$m and selected from among metal oxides, metal nitrides, metal carbides, and metal borides.

Ultrafine particles of alumina, silicon carbides, titanium carbides, silicon oxides, silicon nitrides, and titanium borides are particularly suitable for the present invention.

Glasslike carbons to be used as the main component of the composite material may include those obtained by carbonizing thermosetting resin such as furan and phenol, and those obtained by carbonizing resins modified by co-polymerization or co-polycondensation to provide thermosetting properties such as those of phenol resins. Non-porous glasslike carbons obtained from a starting material of thermosetting resins which may contain more than 20% of water in the state of initial condensate are particularly preferable, as disclosed in the Jap. Pat. Appln. Laid-open Nos. Sho 60-171208, Sho 60-171209, Sho 60-171210 and Sho 60-171211.

These glasslike carbons are amorphous and have an adequate degree of wearability so that when slid against a recording medium, they would become worn before damaging the surface layer of the recording medium.

The ultrafine particles of the present invention are particles having a particle size of less than 1 $\mu$m, preferably less than 0.1 $\mu$m. Such ultrafine particles can be prepared by gas phase reactions such as evaporation in an inert gas, plasma evaporation and chemical vapor deposition; or liquid phase reaction such as precipitation, and thermal decomposition of sprayed molten material. Any of these methods can be used in the present invention.

The particle size of the ultrafine particles varies depending on the use of the glasslike carbon composite material, but the size is preferably less than 0.1 $\mu$m in view of homogeneous property of the glasslike carbons, good homogeneous and stable mixing, and good dispersion with liquid and unhardened precursor. Ultrafine particles to be used in the present invention may be particles used in ceramics, including silica particles such as manufactured by Nippon Aerogel Co., Ltd. (e.g., Aerogel 130; primary particle size of ca. 16 nm), ultrafine particles of aluminum oxides (e.g., Aluminum oxide C; primary particle size of ca. 20 nm), and of titanium oxides (e.g., Titanium oxide P25; primary particle ysize of ca. 21 nm).

Particle size can be measured by a microscope, a coal tar counter, centrifugal precipitation method, electromagnetic wave scattering, and specific surface area measurement. The particle size of ultrafine particles according to the present invention were measured using scanning electron microscope.

The proportion of ultrafine particles is preferable in the range of 0.5% to 20% of the glasslike carbon volume, and more preferably between 0.5% to 10%. Excellent precision processability, wear resistance and coefficient of friction can be obtained within the 0.5%–20% range. If the content of ultrafine particles is below said range, then there is no appreciable effect of adding ultrafine particles. If the particle content exceeds this range, precision processability deteriorates and the coefficient of friction becomes too high.

According to the second aspect of the present invention, the method of preparing said glasslike carbon composite material comprises the steps of mixing an unhardened precursor of a thermosetting resin with one or more types of ultrafine particles having an average particle size of less than 1 μm and selected from metal oxides, metal nitrides, metal carbides and metal borides; hardening the resin; and carbonizing the resin by heating in an inert atmosphere at a temperature higher than 800° C. The carbonization process may preferably include a pre-treatment by heating at a temperature between 800° C. and 1200° C. and a heat treatment under a high pressure of above 1000 atm at a temperature between 1200° C. and 1500° C.

According to the third aspect of the present invention, another method of preparing glasslike carbon material comprises the steps of hardening a material containing a thermosetting resin as its main component, and carbonizing the material thus hardened by heating. The carbonization step includes a pretreatment by heating at a temperature between 800° C. and 1200° C. followed by a heat treatment under a high pressure of above 1000 atm in an inert atmosphere at a temperature between 1200° C. and 1600° C.

Here, the vitreous carbon material and product may include glasslike carbon alone or in combination with composite materials.

Thermosetting resins alone or unhardened precursors mixed with whiskers (see below description) as a filler may be used as the resin material containing thermosetting resin as the main component. Ultrafine particles may be mixed with the whiskers or the whiskers may be employed without ultrafine particles. When ultrafine particles are mixed with whiskers, the particles have an average size of less than 1 μm and selected from metal oxides, metal nitrides, metal carbides, and metal borides. When the filler is used, the heat treatment under high pressure is preferably conducted at a temperature between 1200° C. and 1500° C. One or more kinds of whiskers are selected from among the whiskers of silicon carbides, silicon nitrides and graphites and are mixed with the thermosetting resin. Ultrafine particles and/or whiskers are preferably dispersed in the initial condensate of the resin. Whiskers as used herein are needle-like crystals obtained by natural growth from the solid, condensation of vapor, chemical reactions, one directional freezing of eutectic mixtures, electrodeposition, etc. The thickness ranges from less than 0.05 μm to ca. 10 μm. The greatest advantage of whiskers is that dislocations and defects are hardly, or never in some cases, observed inside the crystals, giving the crystals almost an ideal strength.

The aspect ratio (ratio of the thickness and the length) of whiskers is not specifically defined. Generally, however, the greater the aspect ratio, the greater the strength of the composite material containing whiskers. The present use of whiskers having the aspect ratio of more than 10, or more preferably more than 50 demonstrated the provision of high strength effect in the glasslike carbon composite material of the present invention.

The whisker content is preferably in the range of 0.5% to 20% in volume, of the glasslike carbon material, and more preferably between 0.5% to 10%. Excellent precision processability, wear resistance and coefficient of friction can be obtained within the above ranges. If the whisker content is small, effects of addition can not be obtained. If the content exceeds the above range, precision processability decreases and the coefficient of friction becomes too high.

External mechanical force such as hydraulic pressure can be applied to a sealed vessel to directly or indirectly pressurize the material under processing. The pressure inside the sealed vessel can be raised to 1000 atm or more, pressurizing the sample inside the vessel isometrically. HIP (hot isostatic pressing) treatment is particularly suited for this method. The HIP treatment applies the pressure of inert gas to the object to be treated at a high temperature.

Heat treatment under high pressure achieves the following effects;

(1) prevents formation of voids during carbonization;
(2) reduces the micropores present in the glasslike carbon material, enabling production of a highly dense composite material with improved wear resistance.

Heat treatment under high pressure is also effective in enhancing the bonding strength of the filler with the matrix when ultrafine particles and/or whiskers are used as the filler.

The pretreatment temperature must be raised to 800° C. to 1200° C. and is preferably between 1000° C. and 1200° C. If it exceeds 1200° C., no significant effect of the subsequent heat treatment under high pressure can be obtained. At a temperature below 800° C, the carbonization under pressure will not exhibit the desired effects.

The heat treatment under high pressure is carried out at a temperature between 1200° C. and 1600° C. when the resin material contains a thermosetting resin alone, and between 1200° C. and 1500° C. if the resin material contains the filler as well. The temperature is preferably higher than 1400° C. in either case. When the thermosetting resin alone is used, glasslike carbon will be undesirably graphitized above 1600° C. The glasslike carbon material thus obtained becomes easily worn due to delamination. Experiments have shown that treatment at a pressure above 1000 atm and a temperature above 1600° C. results in a significant increase in wear. These appeared at $d_{002}$ peak of graphite near $2\theta=26.4°$ in a wide angle X-ray diffraction profile of the sample by Cu-Kα line. Wear resistance showed a marked decrease in correspondence with the appearance and growth of the graphite peak. These findings indicate that the final temperature of the treatment should not exceed 1600° C.

When ultrafine particles and/or whiskers are mixed in the unhardened precursor, stress will concentrate on the matrix at the filler surface when the temperature of the heat treatment under high pressure exceeds 1500° C., graphitizing the carbon surrounding the filler. The glasslike carbon material obtained by this treatment will be easily worn due to delamination. Experiments have shown that carbonization at a pressure above 1000 atm and at a temperature above 1500° C. results in a significant increase in wear. It is therefore necessary to maintain the final temperature below 1500° C. Heat treatment under high pressure above 1000 atm, more preferably above 1500 atm, causes favorable effects including:

(1) prevents formation of voids during carbonization;
(2) reduces the micropores present in the glasslike carbon material, enabling production of a highly dense composite material with improved wear resistance; and (3) enhancing the bonding strength of the filler with the matrix.

Ultrafine particles and/or whiskers may be subjected to pretreatment, as is done in the manufacture of fiber reinforced plastics (FRP). The pretreatment is conducted to improve the reliability of the final product composite material of glasslike carbon, and may include surface treatment of ultrafine particles and/or whiskers, addition of surfactant to promote dispersion of particles and/or whiskers, and dispersion of high physical shearing force.

The glasslike carbon composite material according to the present invention retains the low coefficient of friction which is the characteristic of a glasslike carbon material while its wear resistance is improved. Use of the composite material will enable production of sliding parts which cause less friction with and no damage to the members to be contacted and yet which in themselves are excellent in wear resistance and durability.

Pretreatment of the thermosetting resin under appropriate conditions and subsequent heat treatment under high pressure will result in a glasslike carbon material of higher denseness and wear resistance, as well as improved bending strength. Addition of ultrafine whiskers or ceramic particles to the precursor of the thermosetting resin followed by heat treatment will improve the wear resistance and the bending strength of the material while maintaining the low coefficient of friction of the glasslike carbon material itself. Thus, use of the composite material will enable production of sliding parts which cause less friction with and no damage to the members to be contacted with and yet which in themselves are excellent in wear resistance and durability.

Types of members to be contacted with the sliding parts differ depending on the use. In case the sliding parts are used as a magnetic head, a head slider of a floppy disk or a floating slider of a hard disk, then the sliding parts will come in contact with the floppy disk, hard disk or magnetic tape. If the sliding parts are used as a thermal printing head, then the parts will come in contact with paper or polymer sheets whereas the parts will come in contact with steel such as SUJ 2 if used as the ball retainer of a bearing. Such members may have flat or curved surfaces, may be in any shape such as thread, and may be rigid or flexible in their shape.

When the composite material of the present invention is used, for example, as a sliding part of a recording medium, its lubricity can be maintained over a long period of time without using an additional lubricant. The sliding part does not damage or scar the recording medium and yet is in itself less susceptible to wear.

Because of the electric conductivity of the glasslike carbon material, generation of static electricity can be prevented and the portions in contact with the disk recording medium or the recording medium itself may be subject to less dust adhesion.

The glasslike carbon composite material according to the present invention can be used as the head slider of a flexible disk, the floating slider of a hard disk, a thermal printing head, the sliding part of a magnetic head, the ball retainer of a bearing, the ring for high speed twisting, the blade of a vane pump, and bobbins and guides of various types. These parts may be constructed with the composite material alone, as an integral part. It is also possible to use the composite material at portions where such parts come in contact with other members such as the recording medium. The glasslike carbon composite material of the present invention can also be used in the separator for fuel cells, mechanical parts and jigs of various types.

PREFERRED EMBODIMENT OF THE INVENTION

The preferred embodiment of the present invention will now be described in more detail by referring to examples. These, however, are given merely as examples and in no way limit the scope of the present invention. It is noted that "parts" used in the examples denote "parts by weight".

EXAMPLE 1

One hundred parts of furfuryl alcohol (Kao Quaker Co., Ltd.) are added with 5 parts of 0.011 N-HCl aqueous solution, reacted for 6 hours at 96° C. and dehydrated under reduced pressure to obtain a thermosetting resin. The thermosetting resin thus obtained had an addition of 2 wt% of ultrafine particles of alumina (Nippon Aerogel Co., Ltd., Aluminium oxide C) having the primary particle size of ca. 20 nm and mixed for dispersion in a ball mill. The initial condensate of furfuryl alcohol thus obtained (100 parts) was added and thoroughly agitated with 1.5 parts of aqueous solution containing 70% p-toluene sulfonic acid. The mixture was then charged into a mold of 3 mm in thickness and degassed under the reduced pressure. The mixture was then heated for 3 hours at 50° C. -60° C. and further for 5 days at 90° C. to obtain a strip of hardened composite resin. The composite resin was placed in a tube furnace, heated to 1200° C. in a nitrogen stream at a rate of 10° C./hr and maintained at 1200° C. for 2 hours before cooling. The sample had a bending strength of 1050 kg/cm$^2$, which is a slight increase from 100 kg/cm$^2$ obtained in a glasslike carbon material without addition of ultrafine alumina particles. The density of the main component glasslike carbon was 1.5 g/cm$^3$. The apparent specific gravity of alumina added thereto was 75 g/liter. The carbon yield, or the weight ratio before and after carbonization, of the resin used was ca. 50%. As 2 parts of ultrafine alumina particles are added to 100 parts of the resin for hardening and carbonization, the alumina addition per 50 parts of glasslike carbon amounts to 2 parts. In view of the specific gravity of ca. 3.9 of the alumina particles, the volume ratio becomes (50/1.5) per (2/3.9); in other words, the volume of alumina is 1.54 per 100 volume parts of the glasslike carbon. Likewise, the volume ratio becomes 3.08, 6.15 and 19.2, respectively, when 4 parts, 8 parts and 25 parts of alumina particles are mixed to 100 parts of the resin. Accurate volume ratios can be quantitatively determined by measuring the residual alumina after heat treating the composite material in the air to remove the carbon content. The volume ratios calculated from the weight ratio substantially agree with the accurate volume ratios as measured.

EXAMPLE 2

Ultrafine alumina particles were added in the ratios of 0.7, 1, 2, 4, 8, 15 and 20 wt%, respectively, to the thermosetting resin obtained in Example 1, and mixed for dispersion in a ball mill. Carbonization was conducted at 1200° C. as in Example 1.

Measurement of the samples by X-ray diffraction showed that the vitreous carbon composite material obtained was uniformly dispersed with ultrafine alumina particles. The bending strength of the samples with the alumina additions of 0.7, 1, 2, 4, 8, 15 and 20 wt% was 1000, 1020, 1050, 1080, 1080, 1060 and 1010 kg/cm$^2$, respectively.

EXAMPLE 3

Ultrafine particles of titanium oxide (Nippon Aerogel, Titanium oxide P25) with an average primary particle size of 21 nm were added in the ratios of 2 and 5 wt%, respectively, to the thermosetting resin obtained in Example 1 and mixed for dispersion in a ball mill. Carbonization was conducted at 1200° C. as in Example 1.

Measurement of the samples by X-ray diffraction showed that the glasslike carbon composite material obtained was uniformly dispersed with ultrafine particles of titanium carbide. The bending strength of the samples with the additions of 2 and 5 wt% was 1020 and 1050 kg/cm$^2$, respectively.

EXAMPLE 4

To 100 parts of a mixture of spheric semihardened phenol resin (Kanebo Co., Ltd., Bell Pearl) and novolak resin powder (a type of resin which is a condensed product of formaldehyde and phenol under acid catalysts) were added with 2 parts by weight and 5 parts by weight, respectively, of ultrafine alumina particles used in Example 1 and molded by heating using a heat press, to obtain strips of composite hardened resin. The strips of composite hardened resin were heated to 1200° C. in a nitrogen stream at a rate of 10° C./hr and then maintained at this temperature for 2 hours before cooling. The bending strength of the samples with the additions of 2 parts by weight and 5 parts by weight was 1050 and 1060 kg/cm$^2$, respectively.

EXAMPLE 5

A mixture containing 500 parts of furfuryl alcohol and 480 parts of 92% paraformaldehyde was agitated and dissolved at 80° C. A mixture containing 520 parts of phenol, 8.8 parts of sodium hydroxide and 45 parts of water was added dropwise under agitation. After addition was completed, the mixture was reacted for 3 hours at 80° C. A mixture containing 80 parts of phenol, 8.8 parts of sodium hydroxide and 45 parts of water was further added and the resultant mixture was reacted for 4.5 hours at 80° C., and then cooled to 30° C. The mixture was then neutralized with 70% p-toluene sulfonic acid. The neutralized mixture was dehydrated under reduced pressure to remove 150 parts of water and then added with 500 parts of furfuryl alcohol. Viscosity of the resin thus obtained was 680 cps at 25° C. The amount of water which the resin could hold was measured to be 38%.

The initial condensate of the thermosetting resin was added with 2 wt% and 5 wt%, respectively, of ultrafine alumina particles, and mixed for dispersion in a ball mill. Carbonization as in Example 1 was conducted at 1200° C. The bending strength of the samples with the additions of 2 and 5 wt% was 1070 and 1090 kg/cm$^2$, respectively.

EXAMPLE 6

To the initial condensate of the thermosetting resin obtained in Example 1 was added ultrafine particles of alpha-type silicon carbide (Hakusui Chemical Co., Ltd.) in the ratios of 2 wt% and 5 wt%, respectively, and mixed for dispersion in a ball mill. Carbonization as in Example 1 was conducted at 1200° C.

Measurement by X-ray diffraction showed that the samples obtained were a glasslike carbon composite material containing alpha-type silicon carbide. The bending strength of the samples with the additions of 2 and 5 wt% was 1080 and 1090 kg/cm$^2$, respectively.

EXAMPLE 7

A mixture containing 500 parts of furfuryl alcohol and 480 parts of 92% paraformaldehyde was agitated and dissolved at 80° C. A mixture containing 520 parts of phenol, 8.8 parts of sodium hydroxide and 45 parts of water was added dropwise under agitation. After addition was completed, the mixture was reacted for 3 hours at 80° C. A mixture containing 80 parts of phenol, 8.8 parts of sodium hydroxide and 45 parts of water was further added, and the resultant mixture was reacted for 4.5 hours at 80° C. and cooled to 30° C. The mixture was then neutralized with 70% p-toluene sulfonic acid. The neutralized mixture was dehydrated under reduced pressure to remove 150 parts of water and to which was then added, 500 parts of furfuryl alcohol. The viscosity of the resin obtained was 680 cps at 25° C. The amount of water which the resin could hold was measured to be 38%.

The thermosetting resin was charged into a mold of 5 mm in thickness and defoamed under reduced pressure. The resin was then reacted for 3 hours at 50°-60° C. and for another 5 days at 90° C. The strip of resin was placed in a tube furnace, heated to 1200° C. in a nitrogen stream at a rate of 2°-5° C./hr and maintained at this temperature for 2 hours before cooling. The glasslike carbon material was then inserted in the probe of HIP equipment and treated for 2 hours under a pressure of 2000 atm at 1400° C. The density of the sample obtained was 1.60 g/cm$^3$ and the bending strength was 1200 kg/cm$^2$.

EXAMPLE 8

To the initial condensate of the thermosetting resin obtained in Example 7 was added ultrafine alumina particles (Nippon Aerogel, Aluminum oxide C (Delta Alumina)) having an average primary particle size of ca. 20 nm in the ratios of 2 wt% and 5 wt%, respectively, and mixed for dispersion. Carbonization as in Example 7 was conducted at 1200° C. The carbonized material was inserted in the probe of HIP equipment and treated for 2 hours at 1400° C. and 2000 atm.

Measurement by X-ray diffraction showed that the samples obtained were a glasslike carbon composite material containing delta alumina. The density of the samples was 1.65 g/cm$^3$ with the addition of 2 wt% of ultrafine particles and 1.73 g/cm$^3$ with 5 wt% addition, respectively. The bending strength was 1260 and 1300 kg/cm$^2$, respectively.

EXAMPLE 9

To the thermosetting resin obtained in Example 7 was added ultrafine particles of titanium oxide (Nippon Aerogel, Titanium oxide P25) having an average primary particle size of 21 nm in the ratios of 2 wt% and 5 wt%, respectively. The resultant mixture was carbonized as in Example 7 at 1200° C. and then treated in HIP equipment at 1400° C. and 2000 atm.

Measurement by X-ray diffraction showed that the samples were a glasslike carbon composite material containing titanium carbide. The density and the bending strength of the samples to which were added 2 wt% and 5 wt%, were, respectively, 1.63 g/cm$^3$ and 1220 kg/cm$^2$, and 1.68 g/cm$^3$ and 1300 kg/cm$^3$.

EXAMPLE 10

To the thermosetting resin obtained in Example 7 was added ultrafine particles of silicon carbide (Hakusui Chemical Co., Ltd., alpha-SiC) having an average primary particle size of 0.06 μm at the ratios of 2 wt% and 5 wt%, respectively, and mixed for dispersion in a ball mill. The resultant mixture was carbonized as in Example 7 at 1200° C. and then treated in HIP equipment at 1400° C. and 2000 atm.

Measurement by X-ray diffraction showed that the samples obtained were a glasslike carbon composite material containing alpha-type silicon carbide. The density and the bending strength of these samples with the additions of 2 wt% and 5 wt% were, respectively, 1.68 g/cm$^3$ and 1220 kg/cm$^2$, and 1.75 g/cm$^3$ and 1280 kg/cm$^2$.

EXAMPLE 11

To the thermosetting resin obtained in Example 7 was added whiskers of beta-type silicon carbide having a diameter of 0.05-1.5 μm, a length of 20-200 μm and a specific gravity of 3.18 (Tateho Chemical Industries Co., Ltd., Silicon carbide whisker SCW) at the ratios of 2 wt% and 5 wt%, respectively. Polyethylene oxide (molecular weight 600,000–1,100,000) was added at the ratio of 0.25 wt% as an aqueous surfactant, and mixed for dispersion in a ball mill. The resultant mixture was carbonized as in Example 7 at 1200° C. and then treated in HIP equipment at 1400° C. and 2000 atm.

Measurement by X-ray diffraction showed that the glasslike carbon composite material obtained contained beta-type silicon carbide. The density and the bending strength with the additions of 2 wt% and 5 wt% were, respectively, 1.67 g/cm$^3$ and 1900 kg/cm$^2$, and 1.74 g/cm$^3$ and 2400 kg/cm$^2$.

COMPARISON 1

For comparison with Examples 1 through 10, alumina ceramic particles (Nippon Electric Glass Co., Ltd., "Neoceram") were used in Comparison 1.

COMPARISON 2

Likewise, calcium titanate (Sumitomo Special Metals Co., Ltd., "TC-105") was used in Comparison 2.

COMPARISON 3

In order to compare the effects of the mixing ratio, 0.3% by volume of ultrafine alumina particles was added to the glasslike carbon in the same manner as in Example 1 to prepare a composite material.

COMPARISON 4

In the same manner as in Example 1, 25% by volume of ultrafine alumina particles was added to the glasslike carbon to obtain a composite material.

COMPARISON 5

In order to compare the effects of carbonization treatments, strips of thermosetting resin obtained in the process of Example 6 were heated to 1400° C. without the treatment in HIP equipment. The density of the obtained sample was 1.51 g/cm$^3$ and the bending strength 1000 kg/cm$^2$.

COMPARISON 6

In the same manner as in Example 10, the thermosetting resin obtained in Example 7 had an addition of ultrafine particles of silicon carbide at the ratios of 2 wt% and 5 wt%, respectively, and mixed for dispersion in a ball mill. Heat treatment was conducted by raising the temperature to 1400° C. No HIP treatment was conducted.

Measurement by X-ray diffraction showed that the samples obtained were a composite material of alphatype silicon carbide and glasslike carbon. The density and the bending strength of the samples with the additions of 2 wt% and 5 wt% were, respectively, 1.55 g/cm$^3$ and 1080 kg/cm$^2$, and 1.59 g/cm$^3$ and 1090 kg/cm$^2$.

COMPARISON 7

In the same manner as in Example 10, the thermosetting resin obtained in Example 1 had an addition of ultrafine particles of silicon carbide at the ratios of 2 wt% and 5 wt%, respectively, and mixed for dispersion in a ball mill. The mixtures were heat treated at 700° C. and HIP treated at 1400° C. and 2000 atm.

Measurement by X-ray diffraction showed that the samples obtained were a composite material containing alpha-type silicon carbide and glasslike carbon. The density and the bending strength of the samples with the additions of 2 wt% and 5 wt% were, respectively, 1.67 g/cm$^3$ and 1000 kg/cm$^2$ and 1.74 g/cm$^3$ and 1050 kg/cm$^2$.

COMPARISON 8

In the same manner as in Example 10, the thermosetting resin obtained in Example 7 had an addition of ultrafine particles of silicon carbide at the ratios of 2 wt% and 5 wt%, respectively, and mixed for dispersion in a ball mill. The mixtures were heat treated at 1200° C. and HIP treated at 1600° C. and 2000 atm.

Measurement by X-ray diffraction showed that the samples were a composite material containing alpha-type silicon carbide and vitreous carbon, and a portion which had been graphitized. The density and the bending strength of the samples with the additions of 2 wt% and 5 wt% were, respectively, 1.69 g/cm$^3$ and 1200 kg/cm$^2$ and 1.76 g/cm$^3$ and 1200 kg/cm$^2$.

TESTS AND RESULTS

Samples obtained in the above Examples 1 through 11 and Comparisons 1 through 8 were processed, and the coefficient of friction and the amount of wear were measured.

(i) Measurement of coefficient of friction

Figure 1:
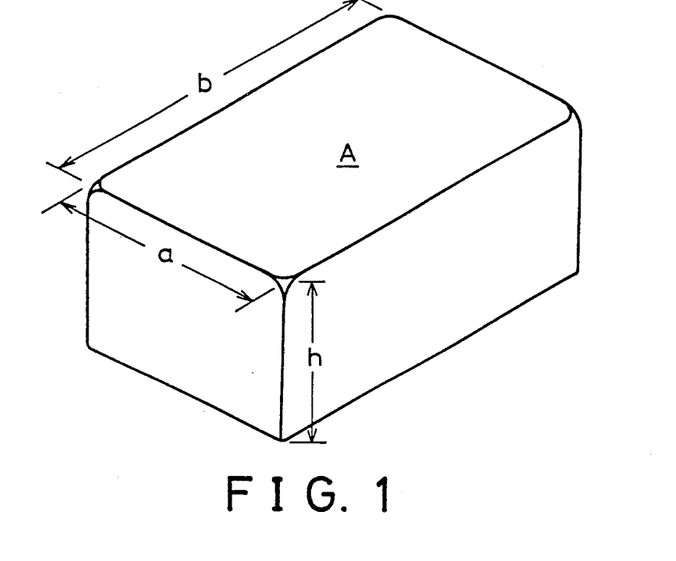
FIG. 1 shows the shape of a test piece used in the measurement of coefficient of friction.

FIG. 1 shows the shape of a test piece used for the measurement of coefficient of friction. The test pieces were obtained by cutting out a piece from each of the samples obtained in Examples 1 through 11 and Comparisons 1 through 8 in the shape of a rectangular parallelepiped (width a 4.0 mm × depth b 6.0 mm × height h 3.0 mm). The sliding surface A was gradually polished from coarse to fine finish, to finally obtain a mirror finish using Emery paper #15000. The edges surrounding the sliding surface A were rounded off using coarser Emery paper to a radius of 0.2~0.3 mm to prepare test pieces for measuring coefficient of friction.

Using the test pieces, the coefficient of friction was measured by the so-called "pin-on-disk method". The test pieces were mounted on a gimbal spring used as the driving device of a floppy disk, applied with a load of ca. 20 g from above and slid against the spindle rotating at an arbitrary speed as well as against the floppy disk mounted on a rotating plate. The force of friction was measured using a strain gauge attached to the arm of the device to estimate the coefficient of friction $\mu$.

(ii) Measurement of wear

Figure 2:
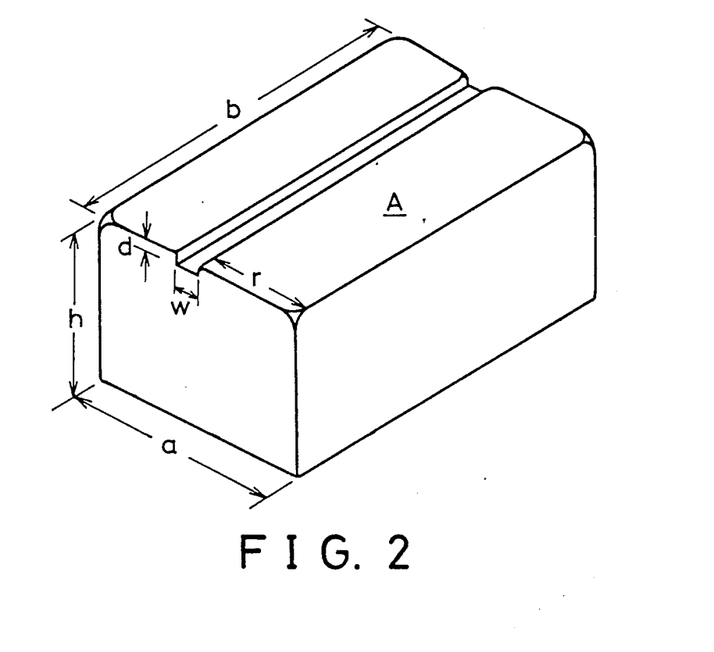
FIG. 2 shows the shape of a test piece used in the measurement of volume.

FIG. 2 shows the shape of a test piece used for the measurement of wear. Each test piece is grooved to a size of width w in 0.5 mm and depth d of several $\mu$m on its sliding surface A using a slicing machine. The distance r from the edge of the groove is 2.0 mm. Using a precision measurement device (Kosaka Laboratories, Co., Ltd., HIPOSS ET-10), the sectional profile of the groove was obtained to determine the groove depth. The test piece was mounted on a gimbal spring which was attached to the head of a floppy disk driving device. A 20g load was applied to the test piece and slid against the floppy disk. By moving the head for one track each time the floppy disk rotates caused wear of the test piece. The groove depth of the test piece was chronologically measured to determine the depth of wear over time.

(iii) Test results

Test results are shown in Tables 1 through 8; Tables 1 through 6 show the test results in Examples 1 through 6, respectively, wherein ultrafine particles are added; Table 7 shows the results obtained from Examples 7 through 11, wherein pretreatment and heat treatment under high pressure were conducted. Table 8 shows the test results in Comparisons 1 through 8. In these Tables, "amount of fine particles" or "amount of addition" represent the amount of addition in parts by volume with respect to 100 parts by volume of the glasslike carbon. Under the column of "disk type", the reference A denotes a gamma-$Fe_2O_3$ coated disk and B a Co-Cr sputtered disk.

TABLE 1

| | amount of particle (volume %) | type of disk | coefficient of friction | depth of wear ($\mu$m) after 20 hr. | depth of wear ($\mu$m) after 100 hr. | disk after wear test |
|---|---|---|---|---|---|---|
| Example 1 | 1.54 | A | 0.12 | 0.03 | 0.09 | no change |
| | 1.54 | B | 0.26 | 0.09 | 0.27 | no change |

TABLE 2

| | amount of particle (volume %) | type of disk | coefficient of friction | depth of wear ($\mu$m) after 20 hr. | depth of wear ($\mu$m) after 100 hr. | disk after wear test |
|---|---|---|---|---|---|---|
| Example 2 | 0.5 | A | 0.12 | 0.03 | 0.10 | no change |
| | 0.5 | B | 0.29 | 0.08 | 0.25 | no change |
| | 0.8 | A | 0.12 | 0.02 | 0.09 | no change |
| | 0.8 | B | 0.30 | 0.09 | 0.25 | no change |
| | 1.5 | A | 0.12 | 0.03 | 0.09 | no change |
| | 1.5 | B | 0.29 | 0.09 | 0.26 | no change |
| | 3.1 | A | 0.14 | 0.03 | 0.07 | no change |
| | 3.1 | B | 0.31 | 0.08 | 0.24 | no change |
| | 6.2 | A | 0.14 | 0.03 | 0.07 | no change |
| | 6.2 | B | 0.33 | 0.07 | 0.21 | no change |
| | 12 | A | 0.17 | 0.02 | 0.07 | no change |
| | 12 | B | 0.38 | 0.05 | 0.15 | no change |
| | 15 | A | 0.17 | 0.03 | 0.06 | no change |
| | 15 | B | 0.39 | 0.05 | 0.18 | slightly scarred |

TABLE 3

| | amount of particle (volume %) | type of disk | coefficient of friction | depth of wear ($\mu$m) after 20 hr. | depth of wear ($\mu$m) after 100 hr. | disk after wear test |
|---|---|---|---|---|---|---|
| Example 3 | 0.9 | A | 0.12 | 0.03 | 0.10 | no change |
| | 0.9 | B | 0.25 | 0.08 | 0.32 | no change |
| | 2.3 | A | 0.14 | 0.03 | 0.07 | no change |
| | 2.3 | B | 0.29 | 0.07 | 0.22 | no change |

TABLE 4

| | amount of particle (volume %) | type of disk | coefficient of friction | depth of wear ($\mu$m) after 20 hr. | depth of wear ($\mu$m) after 100 hr. | disk after wear test |
|---|---|---|---|---|---|---|
| Example 4 | 1.5 | A | 0.14 | 0.05 | 0.11 | no change |

TABLE 4-continued

| amount of particle (volume %) | type of disk | coefficient of friction | depth of wear (μm) after 20 hr. | depth of wear (μm) after 100 hr. | disk after wear test |
|---|---|---|---|---|---|
| 1.5 | B | 0.30 | 0.09 | 0.34 | no change |
| 3.8 | A | 0.15 | 0.04 | 0.09 | no change |
| 3.8 | B | 0.33 | 0.07 | 0.23 | no change |

TABLE 5

| | amount of particle (volume %) | type of disk | coefficient of friction | depth of wear (μm) after 20 hr. | depth of wear (μm) after 100 hr. | disk after wear test |
|---|---|---|---|---|---|---|
| Example 5 | 1.5 | A | 0.12 | 0.04 | 0.19 | no change |
| | 1.5 | B | 0.27 | 0.08 | 0.28 | no change |
| | 3.8 | A | 0.14 | 0.02 | 0.06 | no change |
| | 3.8 | B | 0.29 | 0.07 | 0.20 | no change |

TABLE 6

| | amount of particle (volume %) | type of disk | coefficient of friction | depth of wear (μm) after 20 hr. | depth of wear (μm) after 100 hr. | disk after wear test |
|---|---|---|---|---|---|---|
| Example 6 | 1.9 | A | 0.12 | 0.03 | 0.08 | no change |
| | 1.9 | B | 0.27 | 0.07 | 0.29 | no change |
| | 4.7 | A | 0.15 | 0.02 | 0.07 | no change |
| | 4.7 | B | 0.28 | 0.06 | 0.24 | no change |

TABLE 7

| | amount of addition (volume %) | type of disk | coefficient of friction | depth of wear (μm) after 100 hr. | depth of wear (μm) after 200 hr. | disk after wear test |
|---|---|---|---|---|---|---|
| Example 7 | — | A | 0.10 | — | 0.10 | no change |
| | | B | 0.23 | 0.20 | — | |
| Example 8 | ultrafine particle 1.5 | A | 0.12 | — | 0.08 | no change |
| | | B | 0.26 | 0.18 | — | no change |
| | ultrafine particle 3.8 | A | 0.13 | — | 0.07 | no change |
| | | B | 0.28 | 0.17 | — | no change |
| Example 9 | ultrafine particle 0.9 | A | 0.11 | — | 0.07 | no change |
| | | B | 0.24 | 0.16 | — | no change |
| | ultrafine particle 2.3 | A | 0.13 | — | 0.06 | no change |
| | | B | 0.28 | 0.15 | — | no change |
| Example 10 | ultrafine particle 1.9 | A | 0.12 | — | 0.06 | no change |
| | | B | 0.27 | 0.15 | — | no change |
| | ultrafine particle 4.7 | A | 0.15 | — | 0.05 | no change |
| | | B | 0.28 | 0.14 | — | no change |
| Example 11 | whisker 1.9 | A | 0.13 | — | 0.05 | no change |
| | | B | 0.28 | 0.14 | — | no change |
| | whisker 4.7 | A | 0.15 | — | 0.04 | no change |
| | | B | 0.29 | 0.13 | — | no change |

TABLE 8

| | amount of particle (volume %) | type of disk | coefficient of friction | depth of wear (μm) after 20 hr. | depth of wear (μm) after 100 hr. | disk after wear test |
|---|---|---|---|---|---|---|
| Comparative Example 1 | — | A | 0.48 | 0.02 | 0.05 | running scars |
| | — | B | 0.85 | 0.05 | 0.14 | running scars |
| Comparative Example 2 | — | A | 0.23 | 0.02 | 0.08 | running scars |
| | — | B | 0.77 | 0.06 | 0.30 | running scars |
| Comparative Example 3 | 0.3 | A | 0.12 | 0.07 | 0.18 | no change |
| | 0.3 | B | 0.28 | 0.12 | 0.36 | no change |
| Comparative | 25 | A | 0.19 | 0.02 | 0.05 | slightly scarred |

TABLE 8-continued

| | amount of particle (volume %) | type of disk | coefficient of friction | depth of wear (μm) after 20 hr. | depth of wear (μm) after 100 hr. | disk after wear test |
|---|---|---|---|---|---|---|
| Example 4 | 25 | B | 0.39 | 0.04 | 0.14 | slightly scarred |

TABLE 7

| | amount of particle (volume %) | type of disk | coefficient of friction | depth of wear (μm) after 100 hr. | depth of wear (μm) after 200 hr. | disk after wear test |
|---|---|---|---|---|---|---|
| Comparative Example 1 | — | A | 0.48 | — | 0.03 | running scars |
| | — | B | 0.85 | 0.14 | — | running scars |
| Comparative Example 2 | — | A | 0.23 | — | 0.11 | running scars |
| | — | B | 0.77 | 0.30 | — | running scars |
| Comparative Example 5 | — | A | 0.10 | — | 0.29 | no change |
| | — | B | 0.22 | 0.37 | — | no change |
| Comparative Example 6 | 1.9 | A | 0.12 | — | 0.17 | no change |
| | | B | 0.27 | 0.34 | — | no change |
| | 4.7 | A | 0.15 | — | 0.15 | no change |
| | | B | 0.28 | 0.32 | — | no change |
| Comparative Example 7 | 1.9 | A | 0.12 | — | 0.15 | no change |
| | | B | 0.26 | 0.32 | — | no change |
| | 4.7 | A | 0.13 | — | 0.14 | no change |
| | | B | 0.27 | 0.30 | — | no change |
| Comparative Example 8 | 1.9 | A | 0.12 | — | 0.14 | no change |
| | | B | 0.26 | 0.30 | — | no change |
| | 4.7 | A | 0.13 | — | 0.13 | no change |
| | | B | 0.27 | 0.28 | — | no change |

What is claimed is:

1. A glasslike carbon composition material comprising:
   a glasslike carbon material which containing no graphite as the principal component; and
   ultrafine particles as a reinforcing component having an average particle size of 1 μm or less, said particles being of one or more compounds selected from the group consisting of metal oxides, metal nitrides, metal carbides and metal borides, the proportion of said ultrafine particles being in the range of 0.5% to 20% of the volume of said glasslike carbon material.

2. The glasslike carbon composite material as claimed in claim 1 wherein said ultrafine particles are of one or more compounds selected from the group consisting of aluminas, silicon carbides, titanium carbides, silicon oxides and titanium borides.

3. A glasslike carbon composite material comprising:
   a glasslike carbon material which containing no graphite as the principal component; and
   ultrafine particles as a reinforcing component having an average particle size of 1 μm or less, said particles being of one or more compounds selected from the group consisting of silicon carbides and titanium carbides, the proportion of said ultrafine particles being in range of 0.5% to 20% of the volume of said glasslike carbon material.

4. A glasslike carbon composite material comprising:
   a glasslike carbon material which containing no graphite as the principal component; and
   ultrafine particles as a reinforcing component having an average particle size of 1 μm or less, said particles being of one or more compounds selected from the group consisting of metal oxides, metal nitrides and metal borides, the proportion of said ultrafine particles being in the range of 0.5% to 20% of the volume of said glasslike carbon material.

5. A glasslike carbon composite material essentially of:
   a glasslike carbon material consisting containing no graphite as its principal component; and
   ultrafine particles as a reinforcing component having an average particle size of 1 μm or less, said particles being of one or more compounds selected from the group consisting of metal oxides, metal nitrides, metal carbides and metal borides, the proportion of said ultrafine particles being in the range of 0.5% to 20% of the volume of said glasslike carbon material.

* * * * *

REEXAMINATION CERTIFICATE (3021th)

United States Patent [19]

Yamauchi et al.

[11] B1 4,958,998

[45] Certificate Issued Oct. 8, 1996

[54] GLASSLIKE CARBON COMPOSITE MATERIAL AND METHOD OF PREPARING THE SAME

[75] Inventors: Michihide Yamauchi, Osaka; Hiroyuki Nagamori, Tochigi; Masanobu Wakasa; Atsushi Ishikawa, both of Wakayama, all of Japan

[73] Assignee: Kao Corporation, Tokyo, Japan

Reexamination Request:
No. 90/004,152, Feb. 26, 1996

Reexamination Certificate for:
Patent No.: 4,958,998
Issued: Sep. 25, 1990
Appl. No.: 119,002
Filed: Nov. 10, 1987

[30] Foreign Application Priority Data

Nov. 10, 1986 [JP] Japan .................................. 61-268444
Sep. 9, 1987 [JP] Japan .................................. 62-227115

[51] Int. Cl.$^6$ .................................................. C01B 31/00
[52] U.S. Cl. .......................... 423/445; 423/449; 252/504; 252/507; 252/508

[58] Field of Search ....................................... 423/445, 449; 252/504, 507, 508

[56] References Cited

U.S. PATENT DOCUMENTS

4,466,932  8/1984  Koyama et al. ...................... 264/29.3

FOREIGN PATENT DOCUMENTS

0144862  6/1985  European Pat. Off. .

OTHER PUBLICATIONS

Chemical Abstracts, vol. 105, No. 24, Dec. 1986, p. 271.
Chemical Abstracts, vol. 101, No. 16, Oct. 1984, p. 313.

*Primary Examiner*—Robert Kunemund

[57] ABSTRACT

The present invention provides a glasslike carbon composite material which has reduced surface friction and excellent wear resistance and durability, because of the addition of specific ultrafine ceramic particles as a reinforcing material to a main component of glasslike carbon. The present invention further provides a method for preparing such a glasslike carbon composite material, as well as a method for preparing a glasslike carbon material.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1 to 5 is confirmed.

New claims 6 to 10 are added and determined to be patentable.

*6. A glasslike carbon composition material comprising:*

*a glasslike carbon material which contains no graphite as the principal component; and*

*ultrafine particles as a reinforcing component having an average particle size of 0.1 µm or less, said particles being of one or more compounds selected from the group consisting of metal oxides, metal nitrides, metal carbides and metal borides, the proportion of said ultrafine particles being in the range of 0.5% to 20% of the volume of said glasslike carbon material.*

*7. The glasslike carbon composite material as claimed in claim 6 wherein said ultrafine particles are of one or more compounds selected from the group consisting of aluminas, silicon carbides, titanium carbides, silicon oxides and titanium borides.*

*8. A glasslike carbon composite material comprising:*

*a glasslike carbon material which contains no graphite as the principal component; and*

*ultrafine particles as a reinforcing component having an average particle size of 0.1 µm or less, said particles being of one or more compounds selected from the group consisting of silicon carbides and titanium carbides, the proportion of said ultrafine particles being in the range of 0.5% to 20% of the volume of said glasslike carbon material.*

*9. A glasslike carbon composite material comprising:*

*a glasslike carbon material which contains no graphite as the principal component; and*

*ultrafine particles as a reinforcing component having an average particle size of 0.1 µm or less, said particles being of one or more compounds selected from the group consisting of metal oxides, metal nitrides and metal borides, the proportion of said ultrafine particles being in the range of 0.5% to 20% of the volume of said glasslike carbon material.*

*10. A glasslike carbon composite material consisting essentially of:*

*a glasslike carbon material which contains no graphite as its principal component; and*

*ultrafine particles as a reinforcing component having an average article size of 1 µm or less, said particles being of one or more compounds selected from the group consisting of metal oxides, metal nitrides, metal carbides and metal borides, the proportion of said ultrafine particles being in the range of 0.5% to 20% of the volume of said glasslike carbon material.*

* * * * *